United States Patent [19]
Krueger et al.

[11] Patent Number: 5,100,050
[45] Date of Patent: Mar. 31, 1992

[54] METHOD OF MANUFACTURING DUAL ALLOY TURBINE DISKS

[75] Inventors: Daniel D. Krueger; Michael E. Sauby; Sulekh C. Jain, all of Cincinnati; Bruce P. Bardes, Montgomery, all of Ohio

[73] Assignee: General Electric Company, Cincinnati, Ohio

[21] Appl. No.: 417,095

[22] Filed: Oct. 4, 1989

[51] Int. Cl.$^5$ .................. B23K 20/00; B21K 3/00; B23P 15/00
[52] U.S. Cl. .................. 228/265; 228/193; 228/243; 416/241 R; 72/360; 72/700
[58] Field of Search ........... 228/115, 125, 159, 160, 228/193, 237, 243, 265; 29/156.8 R, 156.8 B; 72/360, 700; 416/241 R

[56] References Cited

U.S. PATENT DOCUMENTS

| | | | |
|---|---|---|---|
| 3,046,640 | 7/1962 | Singleton | 29/197 |
| 3,098,022 | 7/1963 | Karnie | 204/154.2 |
| 3,106,013 | 10/1963 | Rozmus | 29/470.1 |
| 3,219,748 | 11/1965 | Miller | 174/52 |
| 3,225,437 | 12/1965 | Stohr | 29/473.5 |
| 3,259,969 | 7/1966 | Tessman | 29/487 |
| 3,436,804 | 4/1969 | Broverman | 29/471.5 |
| 3,535,762 | 10/1970 | Taylor | 228/265 |
| 3,741,821 | 6/1973 | Athey et al. | 148/13.1 |
| 3,768,147 | 10/1973 | Berry et al. | 416/241 R |
| 3,940,268 | 2/1976 | Catlin | 75/208 |
| 3,950,841 | 4/1976 | Conn | 228/125 |
| 4,043,498 | 8/1977 | Conn, Jr. | 228/265 |
| 4,063,939 | 12/1977 | Weaver et al. | 75/208 |
| 4,094,453 | 6/1978 | Cook et al. | 228/265 |
| 4,096,615 | 6/1978 | Cross | 29/156.8 |
| 4,141,484 | 2/1979 | Hamilton et al. | 228/265 |
| 4,152,816 | 5/1979 | Ewing et al. | 416/241 R |
| 4,183,558 | 1/1980 | Broodman | 228/265 |
| 4,333,671 | 6/1982 | Holko | 285/173 |
| 4,479,293 | 10/1984 | Miller et al. | 416/241 R |
| 4,529,452 | 7/1985 | Walker | 148/11.5 |
| 4,579,602 | 4/1986 | Paulonis et al. | 149/11.5 |
| 4,581,300 | 4/1986 | Hoppin et al. | 428/546 |
| 4,608,094 | 8/1986 | Miller et al. | 148/11.5 |
| 4,680,160 | 7/1987 | Helmink | 419/6 |
| 4,787,821 | 11/1988 | Cruse et al. | 416/185 |
| 4,825,522 | 5/1989 | Iwai et al. | 29/156.8 R |
| 4,843,856 | 7/1989 | Bhowal et al. | 72/700 |

FOREIGN PATENT DOCUMENTS

| | | | |
|---|---|---|---|
| 563251 | 6/1977 | U.S.S.R. | 228/265 |
| 680837 | 8/1979 | U.S.S.R. | 228/265 |
| 2063136 | 6/1981 | United Kingdom | 228/265 |

OTHER PUBLICATIONS

The Welding Journal, "New Forge Welding . . .", pp. 348-358, Apr. 1958.
Metals Handbook Ninth Edition, Solid State Welding, pp. 672-691, copyright 1983.

*Primary Examiner*—Sam Heinrich
*Attorney, Agent, or Firm*—Carmen Santa Maria; Jerome C. Squillaro

[57] ABSTRACT

An article of manufacture having at least a first and a second part, each part having different mechanical properties, compositions, microstructures or combinations thereof, being joined together using a forging process to yield a substantially defect-free joint region. The article in the form of a turbine disk is particularly suited for use in a gas turbine engine in which the hub or inner portion must be resistant to low cycle fatigue and have high strength, while the rim or outer portion must be resistant to stress rupture failure and creep failure.

25 Claims, 1 Drawing Sheet

METHOD OF MANUFACTURING DUAL ALLOY TURBINE DISKS

RELATED APPLICATIONS

The following commonly assigned applications are directed to related subject matter and are being concurrently filed with the present-application, the disclosures of which are incorporated herein by reference::
Ser. No. 07/417,096
Ser. No. 07/417,098
Ser. No. 07/417,097.

The present invention relates generally to a method for manufacturing multi-alloy parts, and more specifically, to a method for manufacturing dual alloy disks for gas turbine engines.

BACKGROUND OF THE INVENTION

In gas turbine engines, disks which support turbine blades rotate at high speeds in an elevated temperature environment. Increased engine efficiency and engine performance require advanced gas turbine engines to operate at ever higher temperatures. The temperatures encountered by the disks of these engines at their outer or rim portion may be 1500° F. or higher, while the temperatures at the inner or hub portion will typically be lower, e.g. of the order of 1000° F. The different operating conditions and temperatures to which the separate portions of the disks are exposed call for different combinations of mechanical properties. The high temperature rim portion must have time dependent or hold time fatigue crack growth resistance and creep resistance, while the highly stressed hub portion must have high burst strength at relatively moderate temperatures and fatigue crack growth resistance. The hub portion also must have high resistance to low cycle fatigue to ensure long component life.

Because of these differing requirements concerning the mechanical properties of the separate disk portions, and the extreme temperature gradients along the radius of a turbine disk, it is difficult, if not impossible, for a single alloy to satisfy the requirements of both the hub and the rim area of a turbine disk of the type that is used in an engine of advanced design. For example, many forged nickel-base alloys have superior tensile and low cycle fatigue properties, but quite limited creep rupture strength or hold time fatigue crack growth resistance, while other nickel-base alloys have excellent creep rupture strength, but poor tensile and fatigue properties.

One solution for meeting the higher operating temperatures required in these more efficient and more powerful advanced engines is to increase the weight of the disk to reduce stress levels, when the alloy used is metallurgically stable and not prone to damage at the desired high temperature. This solution is unsatisfactory for aircraft due to the undesirable increase in the weight of the system which negates the advantages of increased power and efficiency.

Another solution is to use a dual alloy disk wherein different alloys are used in the different portions of the disk, depending upon the properties desired. The disk has a joint region in which the different alloys are joined together to form an integral article. Numerous means for fabricating dual alloy disks have been suggested or evaluated. As employed herein, the term joint refers to a metallurgical joint wherein the joined members are held together by the fusion of their metals or with a third metal as in the case of a diffusion braze or diffusion weld, as opposed to a mechanical joint wherein the joined members are held in contact by mechanical means such as bolts or rivets. The joint and region of altered metal adjacent thereto are referred to as the joint region.

Although fusion welding has been suggested as a solution, the nickel-base superalloys of the type used in disks are difficult to weld in the required configuration.

Inertia welding is a possible alternative. However, with very dissimilar alloys, there is a potential for uneven flow, inadequate joint clean-up and incipient melting in the heat-affected zone. This process also requires large equipment and specialized tooling.

Another technique for bonding parts made of different alloys is by diffusion bonding, as applied to nickel-base alloys. However, this method is currently considered not sufficiently reliable for producing dual alloy disks.

Another method is referred to as bicasting, or casting one portion of an article, such as a rim, directly against another portion, such as a wrought or a forged hub. This method provides an unacceptable mechanical joint, as distinguished from a metallurgical joint. Further, the fact that one portion of the article is necessarily cast causes at least that portion to have all of the potentially inherent defects of a casting, such as inhomogeneities, shrinkage, inclusions and porosity. The presence of such defects is unacceptable for a high speed rotating part.

Still another fabricating technique is hot isostatic pressing. This technique may be employed to consolidate powder used for one portion of a disk, such as the hub, and also to join it to the other portion. In a variation of hot isostatic pressing of powders, two wrought sections are welded together in a hot isostatic press. This technique requires a gas-tight enclosure, such as a separate can, a weld or a braze, around the exposed sides of the joint regions. In yet another variation of the hot isostatic pressing method, an annular ring of powder is hot isostatically pressed between two wrought members. However, the disadvantage of hot isostatic pressing is that any impurities present at the joint prior to hot isostatic pressing will remain there.

Billets made by coextrusion and isoforging, in which a core is made from one alloy and an outer portion is made from another alloy, have been manufactured with relatively little difficulty. However, much additional research is needed to develop forging procedures to control the precise location and shape of the interface between the alloys.

Explosive welding has been used to weld combinations of dissimilar alloys. This process has been found to be useful for cladding one alloy onto the surface of another. Such a process is, however, presently unuseable for joining dual alloy disks, in that the configuration of the joint region of such disks is not suitable for the introduction of explosive energy for bonding a hub to a rim.

Another approach has been to make a single alloy disk whose different parts have different properties. U.S. Pat. No. 4,608,094 which issued Aug. 26, 1986, outlines a method for producing such a turbine disk. The disk is made from a single alloy which has been worked differently in different regions to yield different mechanical properties. Such a disk is, however, subject to the limitations of the single alloy employed. Alternatively, a single alloy disk may have different portions subjected to heat treatment at different temperatures, or at the same temperatures for different times. Such a differential heat treatment will produce a disk having different mechanical properties in different portions. However, the disk is still subject to the previously mentioned limitations of the single alloy used.

U.S. Pat. No. 3,940,268 which issued Feb. 24, 1976, provides a solution for turbine disk/blade assemblies. It discloses a disk of powdered metal material connected to a plurality of radially, outwardly-directed airfoil components located in a mold and metallurgically bonded during hot isostatic formation of the disk element. While blades can be bonded to a disk of a different material by the method set forth in the '268 patent, hybrid or composite turbine rotor structures formed by such methods lack precision and dimensional control between adjacent airfoil components. Such control is required to maintain the desired gas flow through adjacent passages of the airfoil components connected to the disk. Additionally, this solution addresses problems of joining blades to a disk, and not the problems of joining a hub to a rim to form a disk.

The concept of forming a rim portion of a disk with a coarse grain and a central portion of a disk with a fine grain is disclosed in NASA Report No. CR-165224 entitled "Development of Materials and Process Technology for Dual Alloy Disks". The report indicates that the rim portion of a disk is formed from powdered metal by hot isostatic pressing of powdered metal. The hub portion of the disk is then filled with metal powder and is enclosed in a container. The enclosed rim portion and the powdered metal are then subjected to a hot isostatic pressing operation to produce a dual alloy turbine disk.

OBJECTS OF THE INVENTION

It is an object of this invention to provide a new and improved method for making an integral metallic article composed of two or more alloys, each alloy bonded to another alloy through at least one joint region substantially free from defects and having a strength at least as strong as the weaker of the alloys.

Another object of this invention is to provide a new and improved method for making an integral metallic article composed of different alloys in which the properties of one portion of the article vary from those existing in another portion of the article.

It is a further object of the present invention to provide a new and improved method for joining a separate hub and rim into a single integral turbine disk wherein the hub portion comprises a tough, highly-alloyed material to maximize strength and resistance to low cycle fatigue crack propagation in order to assure a long turbine disk life, and wherein the rim portion comprises a material with a composition and microstructure which promotes creep resistance and high temperature hold time fatigue crack growth resistance.

A further object of the present invention is to provide a new and improved method for making a dual alloy turbine disk having optimum properties in each portion of the disk and a joint region therebetween which is substantially free of potentially defect-laden material.

Still another object of this invention is to provide a new and improved method of producing a gas turbine engine disk having optimum tensile and fatigue properties in the hub portion with optimum creep resistance and hold time fatigue crack growth resistance in the rim portion.

SUMMARY OF THE INVENTION

In accordance with the present invention, a novel method is disclosed for joining separate parts from metals having different compositions and/or different mechanical properties by a solid-state joining process to produce a single, integral, metallic article having substantially defect-free metallurgical joints between the metal parts.

Specifically, a discrete metal part made from a metal has a first precisely preformed interface surface. A second discrete part made from a metal and having a precisely preformed interface surface approximately conforming to the first preformed interface surface of the first part is placed in relation to the first part so that the conforming interface surfaces are opposed to each other. Additional metal parts having preformed interface surfaces conforming to preformed interface surfaces of existing parts may be added. For example, a third discrete part having a precisely preformed surface approximately conforming to a second preformed surface on the first part may be placed relative to the second preformed surface of the first part. The opposed preformed surfaces interface with each other, for example, when the parts are placed into a closed die similar to those used in isothermal forging processes.

Prior to the application of a compressive force through the die to the adjacent parts having approximately conforming opposed surfaces, the parts are heated to the minimum temperature required for their plastic (preferably superplastic) deformation. This heating may be performed either before or after the parts are placed within the die, but before application of the compressive force. The minimum temperature is maintained for at least the duration of the application of the compressive force. Preferably, the die is also heated to the same temperature as the parts that are to be joined.

In accordance with the present invention, the die includes at least one cavity of predetermined size positioned adjacent to the intended joint location and extending at least the entire length of the predicted joint. Because the adjacent parts may be made from different metals, different flow stresses are likely to result. Thus, dimensional control of the preformed surfaces is necessary to ensure that die cavities at predetermined locations will receive material which will be expelled from the joint region.

Upon application of the compressive force to the parts through the die, the opposed surfaces are urged into contact against one another. A substantial portion of the applied compressive force is directed to the contact area between the parts. The magnitude of the applied compressive force is selected to first bring about relative movement of the interface surfaces which have been urged into contact with one another. As these contacting surfaces move against one another, extensive local deformation of the metal in the surface region occurs. Continued application of this compressive force results in continued relative movement and continued local deformation of the metal making up the interface surfaces. The relative movement continues as material begins to flow into the die cavity until the die cavity is filled. The compressive force is maintained until the interface surfaces are brought into a conforming relationship, at which time a joint between the opposed surfaces is formed and continues as the die cavity is filled.

In processes used to join parts together, defects of the type normally discovered by nondestructive testing are often found in the joint region. In the present invention, however, the expelled material originating from the initial preformed interface surfaces may contain such defects. The resulting joint is substantially defect-free, the original surface material having been expelled into the die cavity. The expelled material may be subsequently removed by machining or by other removal processes.

In a preferred embodiment, the method of the invention is particularly useful for making disks for gas turbine engines wherein the rim portion is composed of a nickel-base superalloy having hold time fatigue crack growth resistance stress rupture and creep resistance. The hub alloy consists of another nickel-base superalloy having superior tensile strength and low cycle fatigue crack-growth resistance. Although the preferred embodiment of this invention has been described in terms of a nickel-base superalloy, any superalloy may be processed. The processing form may include wrought, forged, hot isostatically pressed and cast forms or forms produced by a combination of these processes.

These and other objects of the present invention, together with further features and advantages thereof will become apparent from the following detailed specification when read in conjunction with the accompanying drawings.

DETAILED DESCRIPTION OF THE INVENTION

In accordance with the present invention, the joining process disclosed herein may be applied to join metal parts having the same or different compositions, where each of the parts has been prepared to provide a preformed joint surface which conforms approximately to a corresponding preformed opposed surface of the part to which it is to be joined. The opposed parts may be made by hot isostatic pressing and will typically have different mechanical properties. The separate parts are preferably made of wrought superalloy forgings which may either have the same nominal composition, but different mechanical properties as the result of thermomechanical treatments, or they may have different compositions. The process utilizes a closed die substantially similar to those used in closed die forging operations, into which the separate parts are placed for joining. Further, although parts having different microstructures may be joined together, it is preferred to join together parts which initially are fine-grained, since coarse-grained parts may not exhibit superplastic behavior.

Closed die forging, as utilized in the joining process which forms the subject matter of the present invention, entails shaping of hot metal completely within the walls of the die portions that come together.

Figure 1:
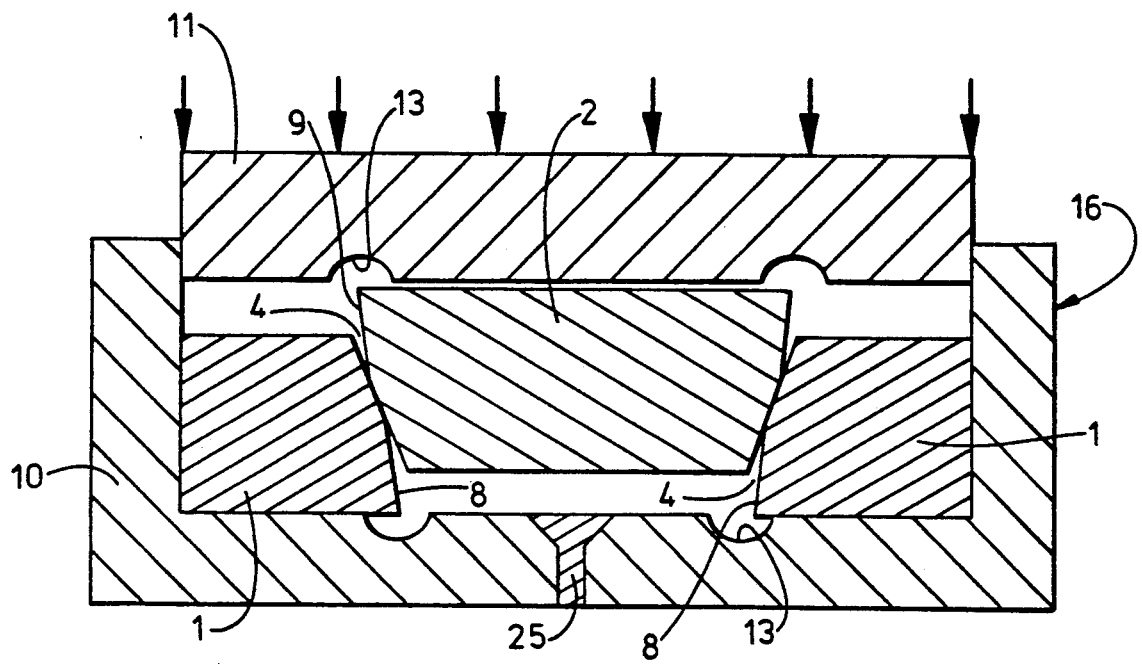
FIG. 1 is a cross-sectional view of a hub and a rim assembled for closed die forging in a die having annular cavities in both the top and bottom die portions.

The workpiece, consisting of the parts to be forged together, is placed within a closed die. The closed die includes two die portions movable with respect to each other, the assembled die portions defining a die chamber or hollow of predetermined size and location as illustrated in FIG. 1. Such dies are well-known to those skilled in the art. The die chamber is in the shape of the final, integral part or article. When completely positioned in the die, the workpiece is enclosed on all side. Forgings may be either blocker-type, conventional or close-tolerance, although close-tolerance types are preferred. In accordance with the present invention, at least one cavity is provided in the die portion adjacent to and coextensive with the joint region to receive ejected metal from the joint between the parts to be forged together.

As shown in FIG. 1 for example, a first part 1 having a preformed inward-facing, internal interface surface 8 is placed together with a second part 2 having a preformed outward-facing, external interface surface 9 that approximately conforms to surface 8, into a closed die 16 having a conventional knockout 25. A variety of configurations for the preformed interfaces, including conical, compound conical frustoconical and compound frustoconical, may be employed. The preformed surfaces may be generated by conventional machining operations which locate particular features and corresponding interface surfaces.

Closed die 16 has a movable die portion 11 and a stationary die portion 10. Prior to forging, first part 1 and second part 2 are heated to the minimum temperature required for plastic (preferably superplastic) deformation, typically before being placed into die 16. In the preferred embodiment, first part 1 and second part 2 are to be heated separately and then placed into die 16 while still at or above the aforesaid desired temperature, while die 16 is heated by separate heating means, such as electrical elements, as are familiar to those skilled in the forging arts. It is also possible to assemble heated first part 1 and second part 2 into die 16 without heating the die or after heating the die to a preselected temperature below that of second part 2 and first part 1, although portions of the assembled parts may be subjected to undesirable cooling, possibly below the desired temperature range.

Although it is not a requirement of the present invention, it is preferable that the confronting interface surfaces be cleaned to the maximum extent possible prior to being placed into the die. Cleaning may be performed by a number of methods, including mechanical or chemical methods, or any combinations thereof. Cleanliness may be maintained by performing the heating and joining operations under a vacuum or by maintaining an inert gas atmosphere.

While at the elevated temperature, first part 1 and second part 2 are subjected to compression within die 16 by the application of force to movable die portion 11. The magnitude of this applied force is initially chosen to produce relative movement of the opposed surfaces at a prescribed rate. This operation is preferably conducted in a vacuum isothermal press or under vacuum or an inert atmosphere.

As shown in FIG. 1, the size and location of cavity 13 within die portion 11 are selected such that cavity 13 is above joint region 4 when second part 2 is assembled into first part 1 within die 16. The location and the shape of this cavity will vary depending on the nature of the die and the shape of the workpiece, and may be formed by the clearance between the die portions.

It is recognized that the location of cavity 13 in top die portion 11 is governed by the location of joint region 4 in the finished article. In accordance with the finished article as an integral disk, cavity 13 should be approximately centered over joint region 4. The location of cavity 13 may be determined empirically or by modeling, either computer modeling or by modeling with a material such as lead, plasticene, plastic, wax or other metallic material. With reference again to FIG. 1, when force is applied in the direction of the arrows in FIG. 1, a substantial portion of this force is directed to cause relative movement of the opposed axisymmetric surfaces 8 and 9. As the die portions approach one another, the relative movement of the opposed surfaces decreases, but extensive local deformation of the material at the interface surfaces, 8 and 9 respectively, occurs concurrent with metallurgical bonding of the surfaces to form a joint region. The force is carried by the small contact area between the opposed surfaces, which becomes the joint region after completion of the metallurgical bonding. Further movement of the die portions toward each other causes further deformation of material in the joint region and flow of this material away from the joint region. It is a characteristic of the present invention that a significant portion of the deformation is confined to the small joint region. As this flow continues, material, which includes the original opposed surface material, is expelled from the joint region into cavity 3. This expelled joint region material contains potential defects, including any defects that may be present due to inadequate or improper cleaning techniques.

Cavity 13 is sized and proportioned to ensure that material from the joint region is expelled into this cavity and that the cavity is of sufficient volume to accept at least all of the expelled joint region material so that joining may be completed in one forging cycle. The volume of the cavity may be approximated by standard volume calculations. For the hub and the rim of the current example, the volume of the cavity may be approximated from the disc thickness and the average cross-sectional area of joint region 4. Assuming a constant cross-section, as in FIG. 1, the cross-section of joint region 4 on the top surface of the disk may be used. The adequacy of the volume calculated for the cavity may be verified by modeling or by actually producing a die having a cavity of this volume and using it to produce a dual alloy part. A cavity of insufficient volume may result in retention of potentially defect-laden material in the joint region. On the other hand, too large a cavity may waste material or may weaken the die and result in its premature failure.

Figure 2:
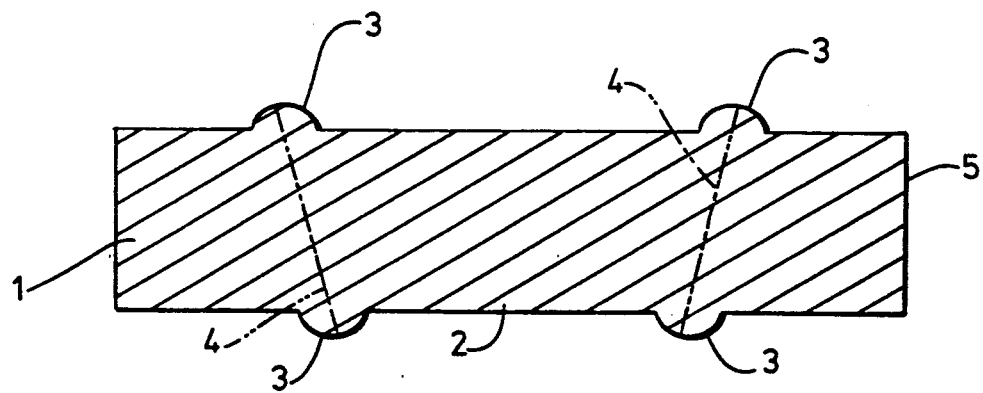
FIG. 2 illustrates the disk of FIG. 1 in cross-section, showing expelled ribs of material on the top and bottom surfaces of the disk following joining by the method of the invention.

In practice, this type of joining results in the expulsion of potentially defect-laden material from the joint region into the cavity or cavities in the dies. An article formed in the die arrangement of FIG. 1 by the use of the joining process herein, is shown in cross-section in FIG. 2. Potentially defect-laden material 3 expelled from joint region 4 into cavity 13 in the die is depicted as a rib on the top surface of disk 5, above joint region 4.

This rib is then removed from the integral article by means of various known machining operations. The resulting integral disk is free or substantially free of most of the defects associated with heretofore available joining processes and may be inspected by standard nondestructive methods to ensure that no detrimental defects remain in the joint region.

As stated above, a substantial portion of the applied force is directed to joint region 4 between portions 1 and 2. This results in extensive local deformation and expulsion of material from joint region 4. Thus, joint region 4, where metallurgical bonding of the confronting interface surfaces occurs, is a region of high strain as a result of the highly concentrated stresses. The joint formed by this process and which is free of substantially all defects will generally have a strength at least as high as the weaker of the metals from which the component parts are made.

The present invention is particularly applicable to the production of gas turbine structures such as turbine disks in which operating conditions require such varying mechanical properties that one alloy alone cannot meet the requirements.

In the preferred embodiment for the making of turbine disks, rim portion 1 of a disk having a central bore is placed into a die having at least one cavity in accordance with the present invention. Hub portion 2 having a corresponding external surface 9 of approximately the same size and configuration as internal surface 8 of rim portion 1, is placed inside the central bore of rim portion 1 within the die. In this embodiment, as illustrated in FIG. 1, preformed external outward-facing surface 9 is the compound axisymmetric surface of two frustri of frustocones having different apex angles.

A frustocone generally is formed by passing a plane through a cone between the base and vertex. As shown in FIG. 1, the preformed outward-facing surface 9 of hub portion 2 is a compound axisymmetric surface having an upper external surface which surface is the loci of points on the surface of a frustocone having a first apex angle, and an lower external surface having a loci of points on the surface of a frustocone having a second, different apex angle, thereby forming a compound surface. Although FIG. 1 illustrates a compound, symmetric surface formed of the exterior surface of two frustocones, external surface 9 may be a simple frustoconical surface or a right conical surface. Internal surface inward-facing 8 is also the compound axisymmetric surface of two frustri of frustocones having different apex angles approximately conforming to external surface 9. As shown in FIG. 1, the preformed inward-facing surface 8 of rim portion 1 is a compound symmetric surface having an upper internal surface which is the loci of points on the surface of a frustocone having a first apex angle, and a lower internal surface having a loci of points on the surface of a frustocone having a second, different apex angle, thereby forming a compound surface. Although FIG. 1 illustrates a compound axisymmetric surface of two frustocones, internal surface 9 may be a simple frustoconical surface or a right conical surface. The aperture or opening created by this internal surface approximately conforms to and receives external surface 9.

Upon application of compressive force, internal surface 8 of rim portion 1 is urged against external surface 9 of hub portion 2. In the preferred embodiment for gas turbine engines, the rim portion is composed of a nickel-base superalloy, with stress rupture and creep resistant alloys exhibiting hold time fatigue crack growth resistance being preferred. The hub is composed of another nickel-base superalloy having superior tensile strength, fatigue crack-growth resistance and high burst strength at moderate temperatures. Suitable and novel alloys for such a dual alloy turbine disk are described in Application Serial Number 07/417,097 and Application Ser. Number 07/417,098.

The alloys are forged at an elevated temperature such that they are in the superplastic deformation range. The die may also be heated to an elevated temperature suitable for superplastic deformation of the workpieces. Material from the joint region is expelled into a cavity in the die adjacent to the joint region upon the application of pressure through the separate portions of the die.

The expelled material from the joint region forms a rib above and/or below the disk, substantially concentric with the joint region. It will be understood that the shape of the expelled material may depend in large measure on the shape of the original, preformed, contacting surfaces, or it may be limited by filling the cavity in the die. The direction and magnitude of the applied compressive force to the parts to be joined must be sufficient so that the parts are urged together accompanied by relative movement of the opposed surfaces in conjunction with deformation in this region. The movement and the deformation of the parts resulting from the application of the compressive force causes expulsion of material from the joint region between the parts, which is accepted by a cavity located adjacent to the joint region. In the above-described example, the rib of expelled material contains the potential defects resulting from the joining process, while the final joint is substantially defect-free. The rib may be subsequently removed and the disk may be inspected by conventional nondestructive testing methods to ensure that no detrimental defects remain in the joint region.

Any of the several parts of the final article may be heat treated prior to joining, provided that the structure developed during the heat treatment is amenable to the joining process and that it is not adversely affected by such process. Rim 1 of the turbine disk preferably consists of an alloy or other material having high creep and stress rupture strength and good hold time fatigue crack growth resistance, while hub 2 is preferably made from an alloy or other material having high tensile strength and which is resistant to fatigue crack growth. Further, there is no conceptual reason to preclude either part from being a cast structure or from being plastically deformed using conventional forging techniques prior to joining.

The invention thus provides a reliable, inexpensive technique for joining different alloys having mechanical properties which can meet the extreme combinations of operating conditions to which the part is exposed.

Although the present invention has been illustrated and described with respect to two parts having conical or frustoconical interfaces being joined to form a disk-shaped article with a conical or frustoconical joint region, it will be understood that Interface surfaces 8 and 9 in FIG. 1 need not be limited to the illustrated configurations, nor need the parts be axisymmetric. The criterion for selecting an interface configuration is that the selected configuration be effective in expelling original surface material from the joint region into a cavity or opening in one of the die portions positioned adjacent to the joint and extending substantially coextensive with the joint for its entire length. Thus, the invention is also applicable to the joining of two or more discrete metal parts having non-axisymmetric configurations (e.g., rectangular bars).

In light of the foregoing discussion, it will be apparent to those skilled in the art that the present invention is not limited to the embodiments illustrated and described. Numerous modifications, changes, substitutions and equivalents will now become apparent to those skilled in the art, all of which fall within the scope contemplated by the invention herein.

What is claimed is:

1. A method of making an integral article from a plurality of discrete metal parts by forming a joint between said parts, said parts having interface surfaces to be joined, said method comprising the steps of:
   (a) heating said parts to at least the minimum temperature required for superplastic deformation thereof;
   (b) placing said parts into a die of the closed die type with said interface surfaces opposed to each other, said die including at least one cavity of predetermined size for receiving expelled interface material;
   (c) while maintaining said parts at least at said minimum temperature, placing said parts under compression by applying compressive force to said die such that said interface surfaces are urged into contact against one another with a substantial portion of said applied compressive force directed to the contact area between said parts, the magnitude of said applied compressive force being selected to first bring about relative movement of said surfaces accompanied by extensive local deformation of said surfaces and continuing to apply said compressive force to provide continuing relative movement of said surfaces accompanied by extensive local deformation and material flow from the joint region into said cavity; and
   (d) maintaining said compressive force until said interface surfaces have been brought into conforming relationship and said joint between said surfaces has been formed and said cavity is filled.

2. The method of claim 1 wherein parts having opposed surfaces have different metal compositions.

3. The method of claim 1 wherein the metals of the parts having opposed surfaces have different mechanical properties.

4. The method of claim 1 wherein said metal parts are comprised of superalloys.

5. The method of claim 4 wherein the discrete superalloy parts with opposed surfaces have different compositions.

6. The method of claim 4 wherein said superalloy parts with opposed surfaces have different mechanical properties.

7. The method of claim 1 wherein said cavity formed in said die adjacent to said joint region is coextensive with said joint region in at least one direction.

8. The method of claim 1 wherein said heating step further includes heating said die to substantially the same temperature as said parts.

9. The method of claim 1 wherein said die includes a pair of die portions movable relative to each other, said die portions forming a chamber in the shape of the integral article of predetermined size and location therebetween, at least one of said die portions containing said cavity for receiving expelled interface material.

10. The method of claim 1 wherein said interface surfaces of said parts are substantially cleaned prior to being placed into said die.

11. The method of claim 1 wherein said interface surfaces are frustoconical interface surfaces.

12. A method of making a dual alloy turbine disk from discrete metal parts by metallurgically joining first and second parts, said first part comprising an alloy having good hold time fatigue crack growth resistance, high creep resistance and high stress rupture resistance, said second part comprising an alloy having high tensile strength and fatigue crack growth resistance, said method comprising the steps of:

(a) preforming surfaces of each part in a substantially compound frustoconical fashion to approximately conform to one another when brought into contact;

(b) heating said parts to at least the minimum temperature required for superplastic deformation thereof;

(c) assembling said parts with said preformed surfaces opposed to each other in a closed die, said die having two die portions forming a chamber therebetween in the shape of the disk, and at least one of said die portions further including at least one cavity of predetermined size located adjacent the region where joining of said opposed surfaces is expected to occur; and (d) while maintaining said parts at least at said minimum temperature, placing said parts under compression by applying compressive force to said die such that said opposed preformed surfaces are urged into contact against one another with a substantial portion of said applied compressive force directed to the contact area between said parts, the magnitude of said applied compressive force being selected to first bring about relative movement of said surfaces accompanied by extensive local deformation of said surfaces and the metallurgical joining of said opposed surfaces, followed by material flow in said joint region, said continued force application further causing material from said joint region to be expelled into said cavity.

13. The method of claim 12 wherein said expelled material contains substantially all of said preformed axisymmetric surface material and defects associated with joining together of said surfaces, thereby providing a joint region which is substantially defect-free.

14. The method of claim 12 wherein said conforming preformed surfaces are cleaned prior to being placed into said die.

15. The method of claim 12 wherein said compound frustoconical surfaces are simple frustoconical surfaces.

16. A method of making a dual alloy turbine disk from discrete metal parts by metallurgically joining said parts, said parts including a rim made from an alloy having good hold time fatigue crack growth resistance, high creep resistance, high stress rupture resistance and high hold time fatigue crack growth resistance, and a hub made from an alloy having high tensile strength and good low cycle fatigue crack growth resistance; said method comprising the steps of:

(a) preforming said rim with a predetermined substantially frustoconical, inward-facing internal surface;

(b) preforming said hub with a predetermined substantially compound frustoconical, outward-facing external surface;

(c) heating said parts to at least the minimum temperature required for superplastic deformation of said parts;

(d) placing said rim within a die of the closed die type;

(e) placing said hub coaxially within said rim such that said preformed surfaces are opposed to one another;

said die having two die portions forming a chamber therebetween in the shape of the disk, at least one of said die portions further including at least one cavity of predetermined dimensions located adjacent to and coextensive with the region where joining of said frustoconical preformed surfaces is expected to occur; and (f) while maintaining said parts at least said minimum temperature, placing said parts under compression in said die such that opposed frustoconical preformed surfaces are urged into contact against one another with a substantial portion of the applied force directed to the contact area between said parts, the magnitude of said applied compressive force being selected to first bring about relative movement of said frustoconical surfaces accompanied by extensive local deformation of said surfaces and the metallurgical joining of said opposed surfaces, followed by material flow in said joint region, said force application further causing material from said joint region to be expelled into said cavity.

17. The method of claim 16 wherein at least one of said parts is a wrought, forged superalloy.

18. The method of claim 16 wherein at least one of said parts is a hot isostatically pressed superalloy.

19. The method of claim 16 wherein said compound frustoconical surfaces are simple frustoconical surfaces.

20. The method of claim 16 wherein said expelled material contains substantially all of said preformed axisymmetric surface material and defects associated with joining together of said axisymmetric surfaces thereby providing a joint region which is substantially defect-free.

21. The method of claim 16 wherein said metal parts are comprised of wrought superalloy forgings.

22. The method of claim 21 wherein the wrought superalloys of said discrete parts have different compositions.

23. The method of claim 21 wherein each of said superalloys has different mechanical properties.

24. The method of claim 21 wherein said superalloys have the same composition, but different microstructures.

25. The method of claim 16 wherein said preformed axisymmetric surfaces of said parts are first cleaned.

* * * * *